Aug. 19, 1924.
R. E. HOWLAND ET AL
1,505,199
ROLL BED ATTACHMENT FOR TRUCKS
Filed Jan. 30, 1922
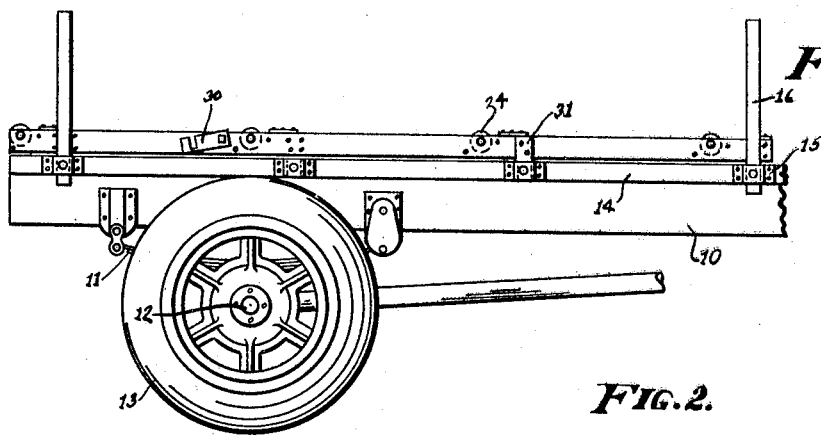
FIG. 1.
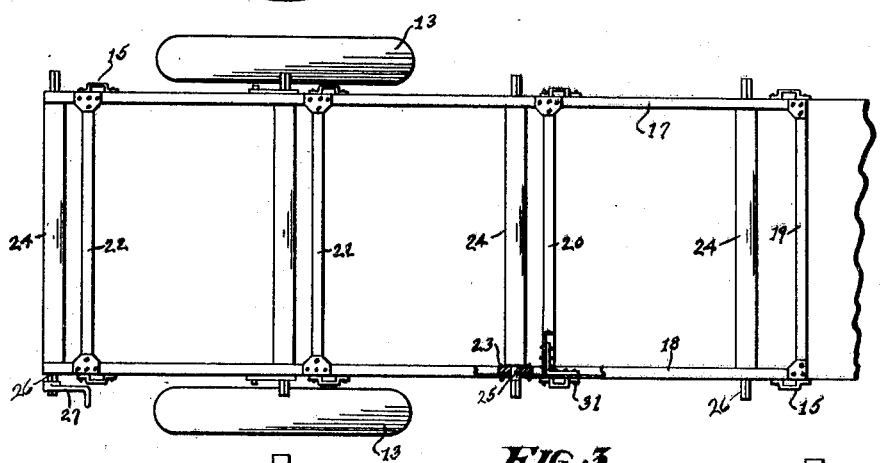
FIG. 2.
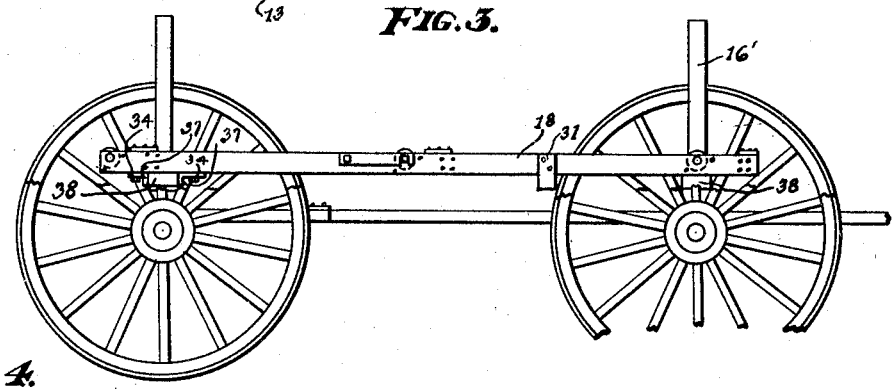
FIG. 3.
FIG. 4.
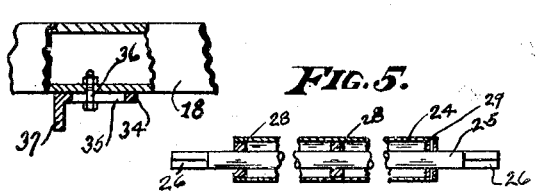
FIG. 5.
INVENTOR.
Lee E. Utter
BY Ralph E. Howland
Erwin Wheeler & Woolard
ATTORNEYS.

Patented Aug. 19, 1924.

1,505,199

UNITED STATES PATENT OFFICE.

RALPH E. HOWLAND AND LEE E. UTTER, OF NASHOTAH, WISCONSIN.

ROLL-BED ATTACHMENT FOR TRUCKS.

Application filed January 30, 1922. Serial No. 532,905.

*To all whom it may concern:*

Be it known that we, RALPH E. HOWLAND and LEE E. UTTER, citizens of the United States, residing at Nashotah, county of Waukesha, and State of Wisconsin, have invented new and useful Improvements in Roll-Bed Attachments for Trucks, of which the following is a specification.

This invention relates to removable roll-bed attachments for trucks, trailers, or wagon beds.

It is the object of this invention to provide means whereby an ordinary truck platform may be temporarily provided with a roll-bed which will operate satisfactorily to enable the owner of the truck to transport lumber thereon, thereby making it unnecessary to have a separate vehicle for lumber transportation purposes.

Further objects of this invention are to provide a removable roll-bed attachment of such construction that it will be rigid, but will nevertheless be light and easily manipulated; to provide such an attachment which, when positioned upon a truck bed or upon any other vehicle, will operate as satisfactorily as if the roll-bed formed a part of the structure of such vehicle; and to provide means whereby such an attachment can readily and quickly be secured upon any vehicle with which it is desired to use the same.

In the drawings:

Fig. 1 is a side elevation of a portion of a truck of ordinary construction showing a removable roll-bed attachment embodying this invention applied thereto.

Fig. 2 is a plan view of the same.

Fig. 3 is a side elevation of the roll-bed attachment illustrating the manner in which it can be mounted upon the bolsters of an ordinary wagon in replacement of the box thereof.

Fig. 4 is a detail view upon an enlarged scale of the attached means used where it is desired to mount this attachment upon a wagon.

Fig. 5 is a detail view upon an enlarged scale of the preferred roller construction used in connection with the removable roll-bed embodying this invention.

Like parts are identified by the same reference characters throughout the several views.

The frame of a truck of ordinary construction is shown at 10, this frame being supported by springs 11 from the axle 12 and wheels 13. Upon the frame 10 is the bed or platform 14 which is permanently attached thereto in the usual manner. The bed or platform 14 of the truck is provided upon its sides with the stake holders 15 within which the stakes 16 may be lodged. It is desired to emphasize the fact that this invention comprises an attachment which is adapted to be mounted upon any truck of ordinary construction. It is not necessary to alter the bed or platform of such a truck in any way for the purpose of enabling it to receive the attachment disclosed herein.

The roll-bed attachment disclosed herein is preferably made up in the form of a skeleton frame having side members 17 and 18 and transverse members 19, 20, 21 and 22, all of channel iron. The corners and other points of connection between these several members are preferably reenforced by plates in the manner shown. Adjacent each transverse member or other suitable intervals along the length of the channeled side members 17 and 18 of the frame are bearing blocks 23 of such size that they will fill the channel of the frame. Openings through these blocks register with corresponding openings in the side members of the frame and are adapted to receive and support the shafts of the rollers.

Each roller 24 is preferably constructed in the manner indicated in Fig. 5. This construction has been found desirable for the reason that it results in a strong, light, and cheaply manufactured roller. A solid axle 25 extends completely across the frame and is journaled within the bearing blocks 23. Each end 26 of the shaft is squared to facilitate the rotation of the roller by means of a removable hand crank such as is shown at 27. At intervals upon the length of shaft 25 are disposed the disks 28 which fit closely thereon. The disks 28 serve to support from the shaft the roller 24. A pin 29 may be passed diametrically through the roller, disks 28 and the shaft 25 at one or more points, if desired to ensure that the rotation of shaft 25 by handle 27 will be communicated to the roller.

It will be noted that the drawings show the rear roller to be located exteriorly of the transverse member 22 of the frame. The arrangement is preferably such that this roller will be located either directly above or slightly to the rear of the back end of the truck platform 14 so that lumber which is being discharged over the rear end of the truck by means of the attachment herein disclosed will have no opportunity to lodge or catch upon the truck bed 14.

One or more of the shafts 25 may be provided with means for securing it against rotation so that the load of lumber carried upon the attachment cannot be accidentally discharged over the rear end of the truck by the natural vibration thereof. Such a latch is shown at 30 and comprises a dog pivoted to the truck at one end and provided with a squared recess engageable over the squared end 26 of shaft 25. The latch is shown in its open position in Figure 1 and is shown closed in Figures 2 and 3.

At one or more points upon the side members 17 and 18 of the roll-bed frame are stub stakes 31 which are adapted to be brought into registry with certain of the stake holders 15 which are normally provided upon the bed 14 of the ordinary truck. These stub stakes can be dropped into the corresponding holders 15 when it is desired to secure the roll-bed frame upon the truck platform. It is not necessary to have more than one set of stub stakes since the stakes 16 ordinarily used upon the truck will serve to maintain the attachment in alignment with the truck platform.

It frequently happens that a contractor operates both trucks and wagons and it may be desired to use either type of vehicle for hauling lumber. To adapt the removable roll-bed attachment above described for service in connection with the ordinary wagon, it is only necessary to provide means for attaching to the side members 17 and 18 of the roll-bed an adjustable stop such as is shown in detail in Fig. 4. This stop comprises merely an L-shaped member 34 provided in its leg with a longitudinally disposed slot 35. A bolt 36 may be passed through this slot and engage in a suitable hole in the frame member 18. It will thus be obvious that the shorter leg 37 of the stop 34 may be adjusted longitudinally of the frame member into engagement with one of the bolsters 38 of the wagon. One stop 34 engaged with each side of the rear bolster will prevent any movement of the frame longitudinally of the wagon. Lateral movement will be prevented by the stakes 16' which are ordinarily supplied for the purpose of positioning the wagon box.

It will be understood from the foregoing that this invention is particularly designed and adapted to meet the requirements of those persons who are using their trucks and wagons for a variety of purposes. The truck or wagon with which this invention can be used need be of no particular type or design. Its bed or platform will be wholly unobstructed when the attachment is not in place, and it is unnecessary to provide any particular attaching means to be permanently mounted upon such a platform. The removable roll-bed will be supplied in such sizes as to conform to the standard dimensions of different types of truck platforms. When it is desired to use a truck for transporting lumber, it will be found that the skeleton framed roll-bed attachment disclosed herein can be mounted in a few moments' time upon the truck. The attachment is so light that it can very readily be handled by two men and in case of emergency might be mounted by one man. When the attachment is in place, the owner of the vehicle will be provided with a lumber transporting truck which will operate in every way as satisfactorily as if the rollers were originally built into the vehicle. When the need for transporting lumber no longer exists, the roll-bed attachment can instantly be removed and the truck will be completely restored to its original condition and will be ready without further change for the transportation of ordinary mechandise.

We claim:

1. A roll bed attachment for vehicles adapted to be removably and interchangeably mounted upon a truck body or upon wagon bolsters, said attachment comprising a skeleton frame, rollers journaled therein, means carried by said frame for engaging a truck body of ordinary construction, and positioning members adjustably and removably carried by the frame for engaging wagon bolsters to retain the frame in position thereon.

2. The combination with a truck provided with a platform and stake holders upon said platform, of a removable roll-bed attachment comprising a skeleton frame, rollers journaled in said frame, and means carried thereby for engaging the stake holders of said platform.

3. A roll-bed attachment for vehicles adapted to be removably and interchangeably mounted upon a truck bed or upon wagon bolsters, said attachment comprising a skeleton frame, rollers journaled therein, means carried by said frame for engaging a truck bed of ordinary construction, and means adjustable upon said frame and wholly removable therefrom whereby said frame may be positioned relative to the bolsters of a wagon.

4. A removable roll-bed comprising a channel iron frame of side members and transverse members, blocks filling the channels in the side members of said frame adjacent each transverse member, and rollers provided with axles journaled in said blocks, the ends of said axles being squared and being extended beyond said frame to facilitate the rotation of the axles.

5. The combination with a truck provided with a platform having a plane upper surface and stake holders at the sides thereof, of a skeleton frame of substantially the width of said platform and adapted to rest flat thereon, transversely extending rollers journaled in said frame, and a stub stake carried by said frame and adapted to register with and to be received into one of said stake holders when said frame is properly positioned upon said platform.

6. In a device of the character described, the combination with a vehicle having a substantially flat bed portion, of a wholly removable skeleton frame adapted for detachable mounting upon said bed portion, said frame including end and side members connected together in rectangular form and provided with transversely extending rollers longitudinally spaced on said frame, the bottom supporting surfaces of said side and end members adjacent the ends of the rollers being disposed substantially entirely in a common plane, whereby to receive support substantially at all load carrying points from said bed portion when mounted thereon.

RALPH E. HOWLAND.
LEE E. UTTER.